US010580572B2

(12) United States Patent
Kanno et al.

(10) Patent No.: US 10,580,572 B2
(45) Date of Patent: Mar. 3, 2020

(54) COIL WINDING DEVICE AND METHOD FOR MANUFACTURING COIL

(71) Applicant: NITTOKU ENGINEERING CO., LTD., Saitama-shi, Saitama (JP)

(72) Inventors: Takashi Kanno, Fukushima (JP); Tatsuya Saito, Fukushima (JP)

(73) Assignee: NITTOKU CO., LTD., Saitama, Saitama (JP)

( * ) Notice: Subject to any disclaimer, the term of this patent is extended or adjusted under 35 U.S.C. 154(b) by 400 days.

(21) Appl. No.: 15/556,213

(22) PCT Filed: Feb. 8, 2016

(86) PCT No.: PCT/JP2016/053694
§ 371 (c)(1),
(2) Date: Sep. 6, 2017

(87) PCT Pub. No.: WO2016/147745
PCT Pub. Date: Sep. 22, 2016

(65) Prior Publication Data

US 2018/0053599 A1 Feb. 22, 2018

(30) Foreign Application Priority Data

Mar. 19, 2015 (JP) ................................ 2015-055755

(51) Int. Cl.
*H01F 7/06* (2006.01)
*H02K 15/00* (2006.01)
(Continued)

(52) U.S. Cl.
CPC ........... *H01F 41/04* (2013.01); *H01F 41/061* (2016.01); *H01F 41/064* (2016.01);
(Continued)

(58) Field of Classification Search
CPC ......... Y10T 29/49071; Y10T 29/49002; Y10T 29/4902; Y10T 29/49069; Y10T 29/53143; H01F 41/061; H01F 5/00; H01F 41/074
(Continued)

(56) References Cited

U.S. PATENT DOCUMENTS

| | | | | |
|---|---|---|---|---|
| 9,704,645 | B2 * | 7/2017 | Sugimoto | H01F 41/04 |
| 10,163,565 | B2 * | 12/2018 | Hofste | H01F 41/088 |
| 2016/0049239 | A1 | 2/2016 | Sugimoto | |

FOREIGN PATENT DOCUMENTS

| | | | |
|---|---|---|---|
| JP | S62-23346 | A | 1/1987 |
| JP | H10-154626 | A | 6/1998 |

(Continued)

*Primary Examiner* — Thiem D Phan
(74) *Attorney, Agent, or Firm* — Rabin & Berdo, P.C.

(57) ABSTRACT

A coil winding device includes a wire rod delivering machine configured to deliver a wire rod through a nozzle, a wire storing jig configured to store the wire rod delivered from the nozzle, a wire-wound member around which the wire rod is wound, a wire-wound-member rotation mechanism configured to rotate the wire-wound member to wind the wire rod delivered from the nozzle around the wire-wound member, and a wire-storing-jig turning mechanism configured to turn the wire storing jig around a rotation axis of the wire-wound member to wind the wire rod delivered from the wire storing jig around the wire-wound member. The rotation axis of the wire-wound member and a wire-storing central axis of the wire storing jig are mutually orthogonal.

4 Claims, 9 Drawing Sheets

(51) Int. Cl.

| | |
|---|---|
| ***H01F 41/04*** | (2006.01) |
| ***H01F 41/088*** | (2016.01) |
| ***H01F 41/061*** | (2016.01) |
| ***H01F 41/064*** | (2016.01) |
| ***H01F 41/082*** | (2016.01) |

(52) U.S. Cl.
CPC ......... *H01F 41/082* (2016.01); *H01F 41/088* (2016.01); *Y10T 29/49071* (2015.01); *Y10T 29/53143* (2015.01)

(58) Field of Classification Search
USPC .................................. 29/605, 604, 606, 732
See application file for complete search history.

(56) References Cited

FOREIGN PATENT DOCUMENTS

| | | | |
|---|---|---|---|
| JP | H11-297559 | A | 10/1999 |
| JP | 2009-10145 | A | 1/2009 |
| JP | 2012-146890 | A | 8/2012 |
| WO | WO-2014/167970 | A1 | 10/2014 |

* cited by examiner

COIL WINDING DEVICE AND METHOD FOR MANUFACTURING COIL

TECHNICAL FIELD

The present invention relates to a coil winding device and a method for manufacturing a coil.

BACKGROUND ART

Conventionally, to deal with downsizing of a coil, what is called alpha winding (or, "outer-outer winding" in other words) such that a wire rod is closely wound not to form an unnecessary gap between winding layers, and a winding starting end and a winding terminating end of the wire rod are wired at an identical winding layer is heavily used. As this alpha winding coil, a two-row spiral coil has been known. The two-row spiral coil includes first and second coils which is made by winding the wire rod in a spiral, and an inside crossover wire that couples inner peripheral end portions of these first and second coils one another.

As a manufacturing device of the two-row spiral coil, JPH10-154626A proposes a device that includes first and second wheels, a winding wire supply portion, and a wire storing portion. The first and second wheels are opposed at an interval of a clearance by two wire rods to mutually rotate in opposite directions around a winding core. The winding wire supply portion delivers the wire rod toward a guide groove or a hole of the first wheel. The wire storing portion stores the wire rod in a winding state and delivers this wire rod toward a guide groove or a hole of the second wheel.

At this manufacturing device, the winding starts at any position of the wire rods with respect to an outer periphery of the winding core, the first and second wheels are mutually rotated in the opposite directions. In view of this, the wire rods extending to both sides from the winding starting position are simultaneously wound around the winding core mutually in the opposite directions to form winding wire portions that are two-layered in an axial direction of the winding core, at the outer periphery of the winding core. Then, leading the wire rods from outer peripheries of the respective winding wire portions can relatively easily manufacture the two-row spiral coil where the winding starting ends and the winding terminating ends of the wire rods are extracted from the identical winding layer at the outermost periphery.

SUMMARY OF INVENTION

However, at the coil manufacturing device disclosed in JPH10-154626A, the first and second wheels are rotated mutually in the opposite directions to wind the wire rod delivered from the wire rod supply portion, around the winding core via the rotating first wheel. Thus, there is a trouble where this wire rod delivered from the wire rod supply portion is twisted to be wound around the winding core.

At the coil manufacturing device in JPH10-154626A, since the wire rod having a circular-shaped cross-sectional surface is used, even if the wire rod is twisted to be wound around the winding core, this does not influence its outer shape. However, recently, to improve a space factor of the wire rod, there are many requests to use a rectangular wire rod having a rectangular-shaped cross-sectional surface. In view of this, if such rectangular wire rod is twisted to be wound around the winding core, this reduces a proportion occupied by the rectangular wire rod to generate a trouble that significantly enlarges the outer shape of the coil.

It is an object of the present invention to provide a coil winding device and a method for manufacturing a coil that ensure winding without twisting the wire rod.

According to one aspect of the present invention, a coil winding device includes a wire rod delivering machine configured to deliver a wire rod through a nozzle, a wire storing jig configured to store the wire rod delivered from the nozzle, a wire-wound member around which the wire rod is wound, a wire-wound-member rotation mechanism configured to rotate the wire-wound member to wind the wire rod delivered from the nozzle around the wire-wound member, and a wire-storing-jig turning mechanism configured to turn the wire storing jig around a rotation axis of the wire-wound member to wind the wire rod delivered from the wire storing jig around the wire-wound member. The rotation axis of the wire-wound member and a wire-storing central axis of the wire storing jig are mutually orthogonal.

According to another aspect of the present invention, a method for manufacturing a coil includes storing a wire rod delivered from a nozzle in a wire storing jig, rotating a wire-wound member to wind the wire rod delivered from the nozzle around the wire-wound member, and turning the wire storing jig around a rotation axis of the wire-wound member to wind the wire rod delivered from the wire storing jig around the wire-wound member. The rotation axis of the wire-wound member and a wire-storing central axis of the wire storing jig are mutually orthogonal.

DESCRIPTION OF EMBODIMENTS

The following describes an embodiment of the present invention with reference to the accompanying drawings.

Figure 1:
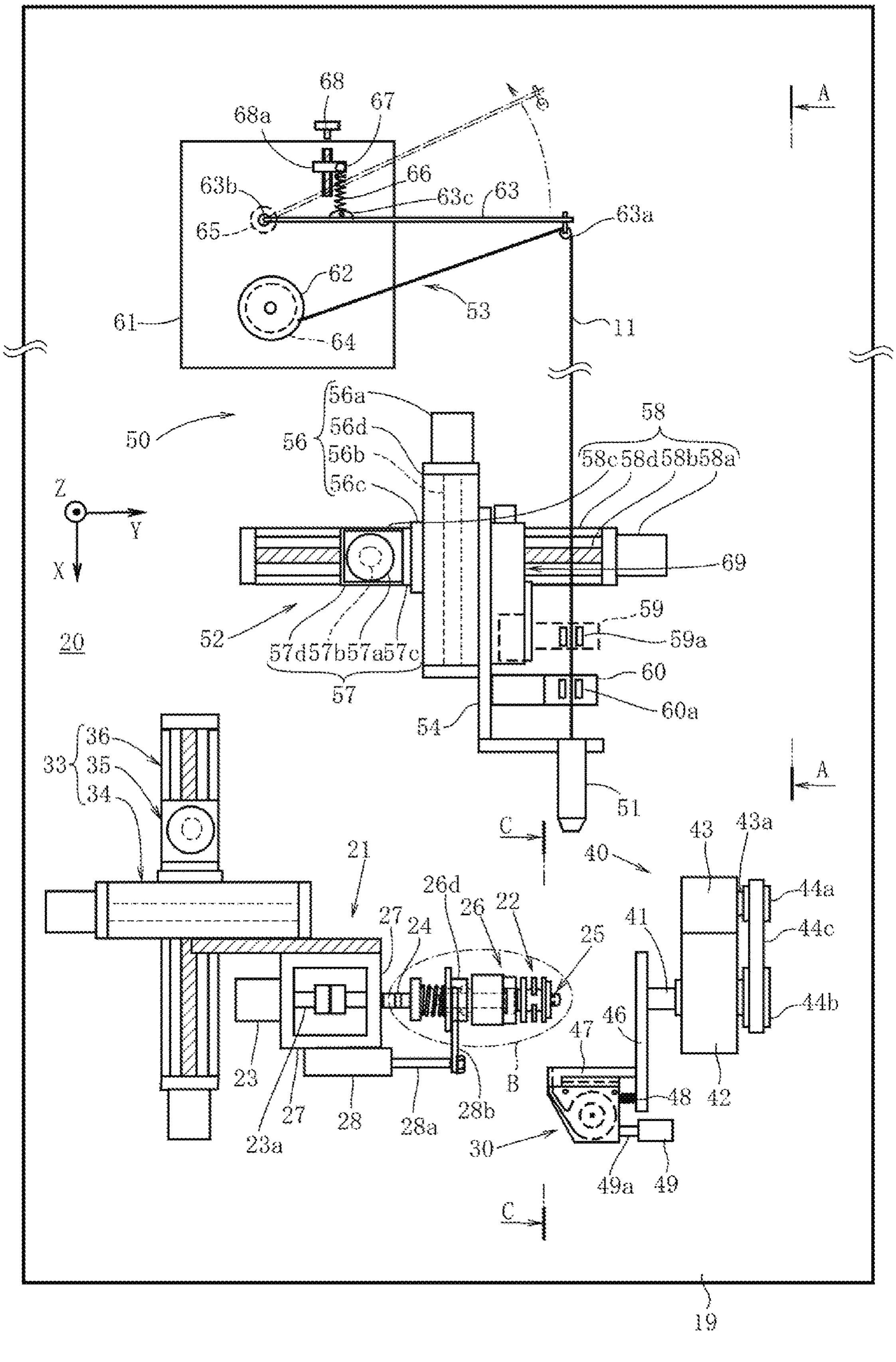
FIG. 1 is a plan view illustrating a winding device according to an embodiment of the present invention.

FIG. 1 illustrates a coil winding device 20 according to the embodiment of the present invention. Here, X, Y, and Z three axes that mutually orthogonal are set. The X-axis extends in an approximately horizontal front-rear direction.

The Y-axis extends in an approximately horizontal transverse direction. The Z-axis extends in an approximately vertical direction. Considering them, a configuration of the coil winding device 20 will be described.

The coil winding device 20 winds a wire rod 11 such that a winding starting end and a winding terminating end are wired at an identical winding layer. The coil winding device 20 includes a wire rod delivering machine 50 disposed on a mounting 19. The wire rod delivering machine 50 delivers the wire rod 11 through a nozzle 51. The wire rod delivering machine 50 includes the nozzle 51, a nozzle moving mechanism 52, and a tension device 53. The wire rod 11 is inserted through the nozzle 51. The nozzle moving mechanism 52 moves the nozzle 51 in the three-axis directions. The tension device 53 adds tensile force to the wire rod 11. The nozzle 51 is secured to a support plate 54. The nozzle moving mechanism 52 moves the support plate 54 in the three-axis directions with respect to the mounting 19.

Figure 2:
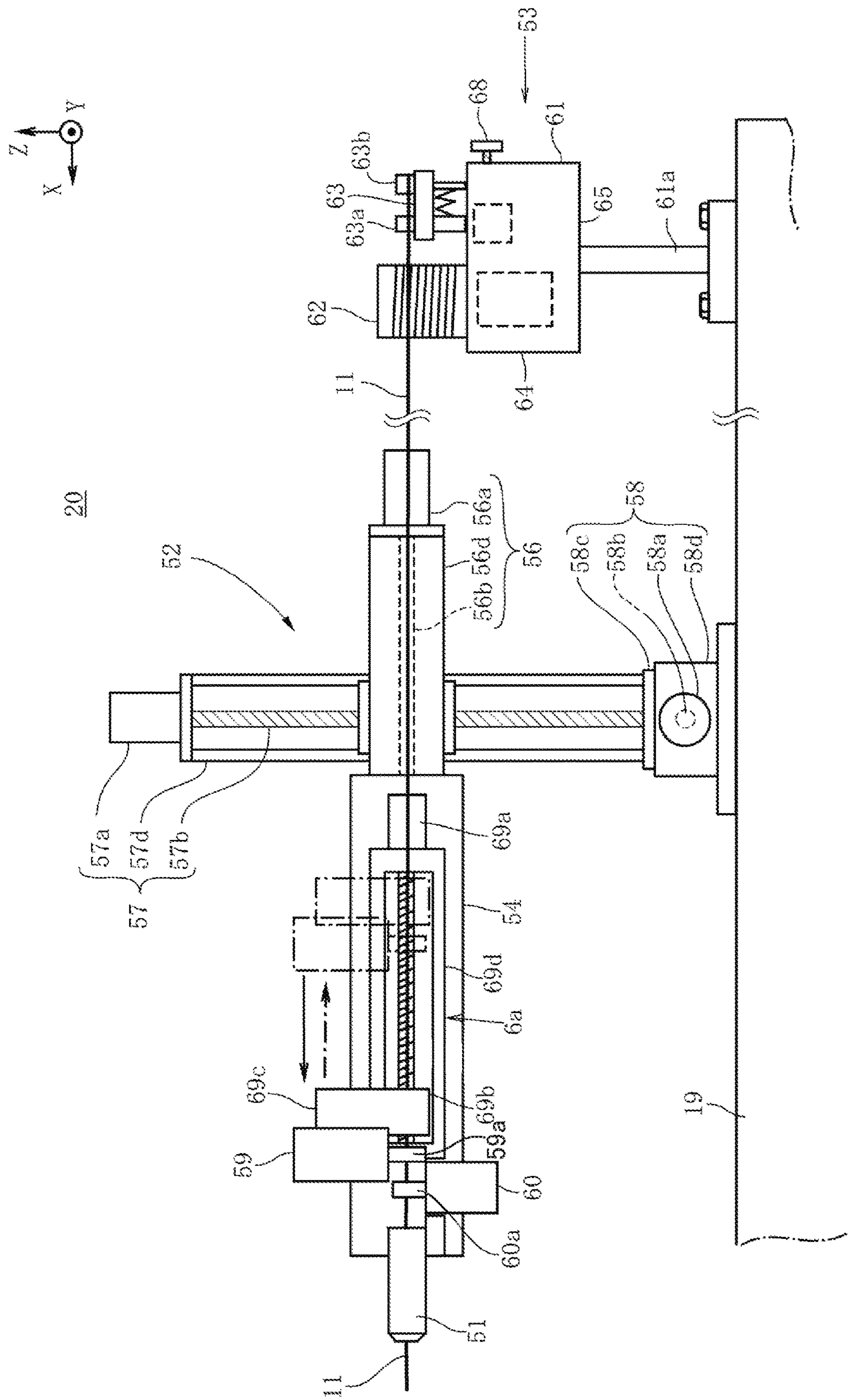
FIG. 2 is an arrow view taken along the line A-A in FIG. 1.

As illustrated in FIG. 1 and FIG. 2, the nozzle moving mechanism 52 is constituted by combination of expansion/contraction actuators 56 to 58 in the X-axis, Y-axis, and Z-axis directions. The respective expansion/contraction actuators 56 to 58 that constitute the nozzle moving mechanism 52 include elongate box-shaped housings 56*d* to 58*d*, ball screws 56*b* to 58*b*, and followers 56*c* to 58*c*. The ball screws 56*b* to 58*b* are disposed inside the housings 56*d* to 58*d* by extending in longitudinal directions, and turned to be driven by servo motors 56*a* to 58*a*. The followers 56*c* to 58*c* are screwed with the ball screws 56*b* to 58*b* to move in parallel. When the servo motors 56*a* to 58*a* drive to rotate the ball screws 56*b* to 58*b*, the followers 56*c* to 58*c* screwed with the ball screws 56*b* to 58*b* move along the longitudinal directions of the housings 56*d* to 58*d*.

The support plate 54 at which the nozzle 51 is disposed is mounted on the housing 56*d* of the expansion/contraction actuator 56 in the X-axis direction. The support plate 54 is movable in the X-axis direction. The follower 56*c* of the expansion/contraction actuator 56 in the X-axis direction is mounted on the follower 57*c* of the expansion/contraction actuator 57 in the Z-axis direction, such that the support plate 54 is movable in the Z-axis direction with the expansion/contraction actuator 56 in the X-axis direction. The housing 57*d* of the expansion/contraction actuator 57 in the Z-axis direction is mounted on the follower 58*c* of the expansion/contraction actuator 58 in the Y-axis direction, such that the support plate 54 is movable in the Y-axis direction with the expansion/contraction actuators 56, 57 in the X-axis and Y-axis directions. The housing 58*d* of the expansion/contraction actuator 58 in the Y-axis direction extends in the Y-axis direction to be secured to the mounting 19. The respective servo motors 56*a* to 58*a* at the respective expansion/contraction actuators 56 to 58 are coupled to a controller (not illustrated) that controls them.

The tension device 53 provides the tensile force to the delivered wire rod 11 and can pull back the wire rod 11. The tension device 53 includes a casing 61, and a drum 62 and a tension bar 63. The casing 61 is disposed at the mounting 19 via a support pillar 61*a* (FIG. 2). The drum 62 and the tension bar 63 are disposed on a top side of the casing 61.

The wire rod 11 is a rectangular wire rod whose cross-sectional shape is rectangular. That is, the rectangular wire rod 11 has the cross-sectional shape having parallel pair of long sides and parallel pair of short sides. At the rectangular wire rod 11, the long side having a large dimension is defined as a width W, and the short side having a small dimension is defined as a thickness t (see FIG. 8). Thus, at the rectangular wire rod 11, the width W is larger than the thickness t.

The wire rod 11 is prepared by being wound around the drum 62 as curving in a direction of the thickness t. A delivering control motor 64 is disposed inside the casing 61. The delivering control motor 64 rotates the drum 62 around which the wire rod 11 is wound to deliver the wire rod 11. The wire rod 11 delivered from the drum 62 is introduced to a wire rod guide 63*a* disposed at a distal end of the tension bar 63. The wire rod 11 introduced to the wire rod guide 63*a* is inserted through the nozzle 51 from the wire rod guide 63*a* to be wired.

The tension bar 63 is turnable taking a turning shaft 63*b* extending in the Z-axis direction at a base end as a supporting point. The turning shaft 63*b* has a turning angle detected by a potentiometer 65 as turning angle detecting means housed in the casing 61 to be mounted on the turning shaft 63*b*. The potentiometer 65 has a detection output input to the controller (not illustrated), and then, control output from the controller is coupled to the delivering control motor 64.

On a predetermined position between the turning shaft 63*b* and the wire rod guide 63*a* of the tension bar 63, one end of a spring 66 is mounted via a mounting bracket 63*c*. The spring 66 is an elastic member as biasing means that adds biasing force to a turning direction of the tension bar 63. The spring 66 adds the elastic force corresponding to the turning angle to the tension bar 63. The other end of the spring 66 is secured to a moving member 67. The moving member 67 is screwed with a male thread 68*a* of a tension adjusting screw 68, and configured to be adjusted to move in accordance with rotation of the male thread 68*a*. Thus, a fixed position of the other end of the spring 66 can be displaced, and it is configured to adjust the tensile force of the wire rod 11 added by the tension bar 63.

The controller (not illustrated) controls the delivering control motor 64 such that the turning angle detected by the potentiometer 65 becomes a predetermined angle. Therefore, at the tension device 53, the spring 66 adds the tensile force to the wire rod 11 via the tension bar 63, and the drum 62 rotates such that the tension bar 63 has the predetermined angle to deliver a predetermined amount of the wire rod 11. Accordingly, the tensile force of the wire rod 11 is maintained at a predetermined value.

As illustrated in FIG. 2, at the support plate 54 at which the nozzle 51 is disposed, a movable holding device 59 and a secured holding device 60 are disposed, in addition to the nozzle 51. The movable holding device 59 and the secured holding device 60 inhibit movement of the wire rod 11 that passes through the nozzle 51 by holding the wire rod 11 with holding pieces 59*a*, 60*a*, and separates the holding pieces 59*a*, 60*a* from the wire rod 11 to allow the movement of the wire rod 11. The secured holding device 60 is directly mounted on the support plate 54. The movable holding device 59 is mounted on the support plate 54 via an expansion/contraction actuator 69 that moves the holding piece 59*a* in the X-axis direction with respect to the support plate 54.

The expansion/contraction actuator 69 has a structure identical to that of the above-described expansion/contraction actuator 56 in the X-axis direction. The movable holding device 59 is mounted on a follower 69*c* moved in a longitudinal direction of a housing 69*d* by a ball screw 69*b* in accordance with rotation of a servo motor 69*a*. In view of this, in a state where the secured holding device 60 opens the holding piece 60*a* to allow the movement of the wire rod 11, the expansion/contraction actuator 69 moves the movable holding device 59 where the holding piece 59*a* holds the wire rod 11 toward the nozzle 51 by a predetermined length, thus delivering the wire rod 11 from the nozzle 51 by the predetermined length. The movable holding devices 59 and the secured holding device 60 are moved with the nozzle 51 by the nozzle moving mechanism 52 to be configured to be controllable by the controller (not illustrated).

Figure 5:
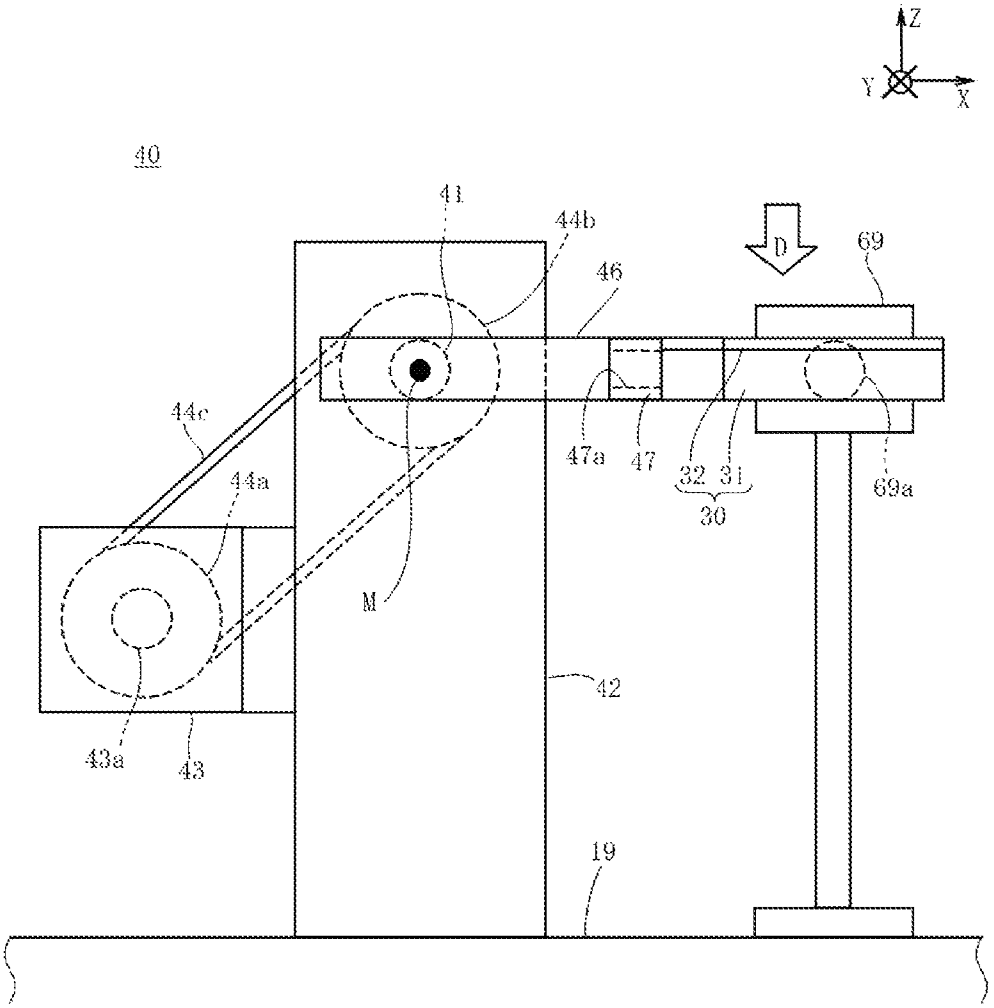
FIG. 5 is an arrow view taken along the line C-C in FIG. 1, illustrating a wire-storing-jig turning mechanism.
Figure 6:
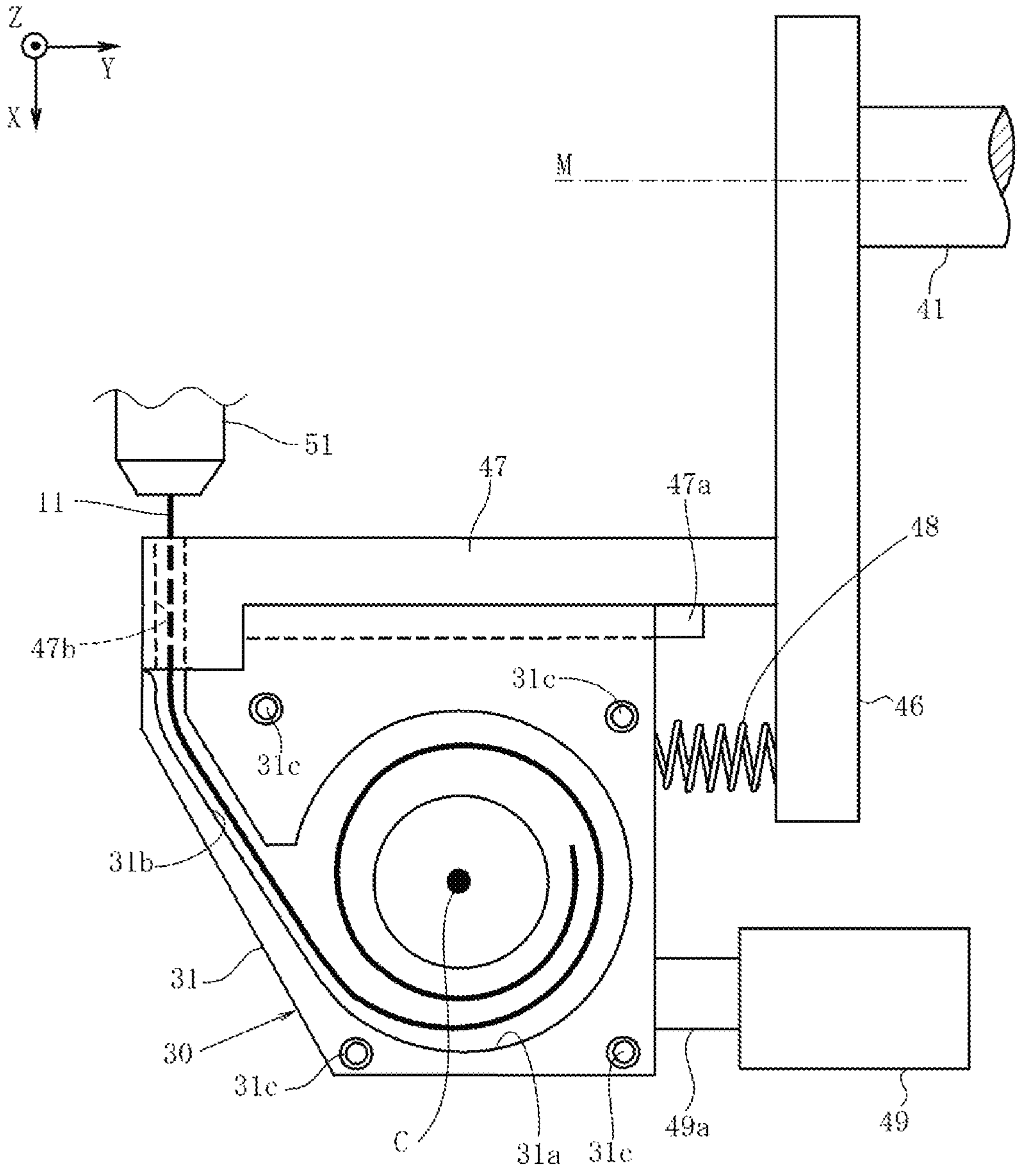
FIG. 6 is a view viewed from a direction D in FIG. 5, illustrating a state where a lid body of a wire storing jig is removed to store a wire rod in a plate-shaped main body.

Returning to FIG. 1, the coil winding device 20 includes a wire storing jig 30 stores the wire rod 11 delivered from the nozzle 51 of the wire rod delivering machine 50. The wire rod 11 is stored to be curved or stored to be wound in a spiral. As illustrated in FIG. 5, the wire storing jig 30 includes a thick plate-shaped main body 31 and a cover plate 32. The cover plate 32 covers one surface of the plate-shaped main body 31 to seal it. As illustrated in FIG. 6, on the one surface of the plate-shaped main body 31 covered with the cover plate 32, a circumferential groove 31*a* and a communication groove 31*b* are formed. The circumferential groove 31*a* is continuous in a circumferential direction. The communication groove 31*b* smoothly extends from an outer periphery of the circumferential groove 31*a* toward a side edge of the plate-shaped main body 31 to open at this side edge. Reference numerals 31*c* indicate female thread holes 31*c* for mounting the cover plate 32 on the plate-shaped main body 31.

When the wire rod 11 is got into from an opening end of the communication groove 31*b* opened at the side edge of the plate-shaped main body 31, the wire rod 11 reaches the circumferential groove 31*a* from the communication groove 31*b* to be guided to an outer periphery of the circumferential groove 31*a*, thus being curved. That is, the wire rod 11 curves in the direction of the thickness t.

When the wire rod 11 has reached a whole circumference of the circumferential groove 31*a*, the wire rod 11 is housed in the circumferential groove 31*a* by drawing a spiral to be stored. That is, by winding the wire rod 11 in more than one turn, the wire rod 11 is wound over in the direction of the thickness t to be stored in the spiral. In view of this, the circumferential groove 31*a* has a central axis C corresponding to a wire-storing central axis C of the wire storing jig 30.

In this embodiment, the rectangular wire rod is used as the wire rod 11. Thus, the circumferential groove 31*a* and the communication groove 31*b* are formed deeper than the width W of the wire rod 11.

Figure 4:
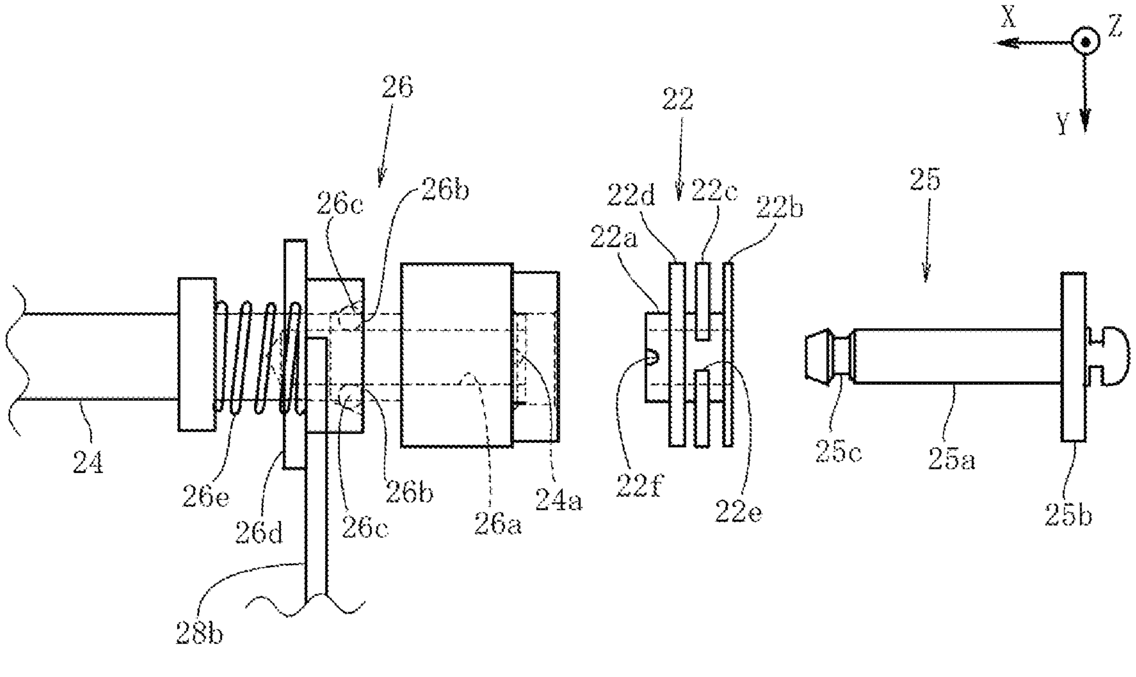
FIG. 4 is an exploded view of the wire-wound-member rotation mechanism.
Figure 10:
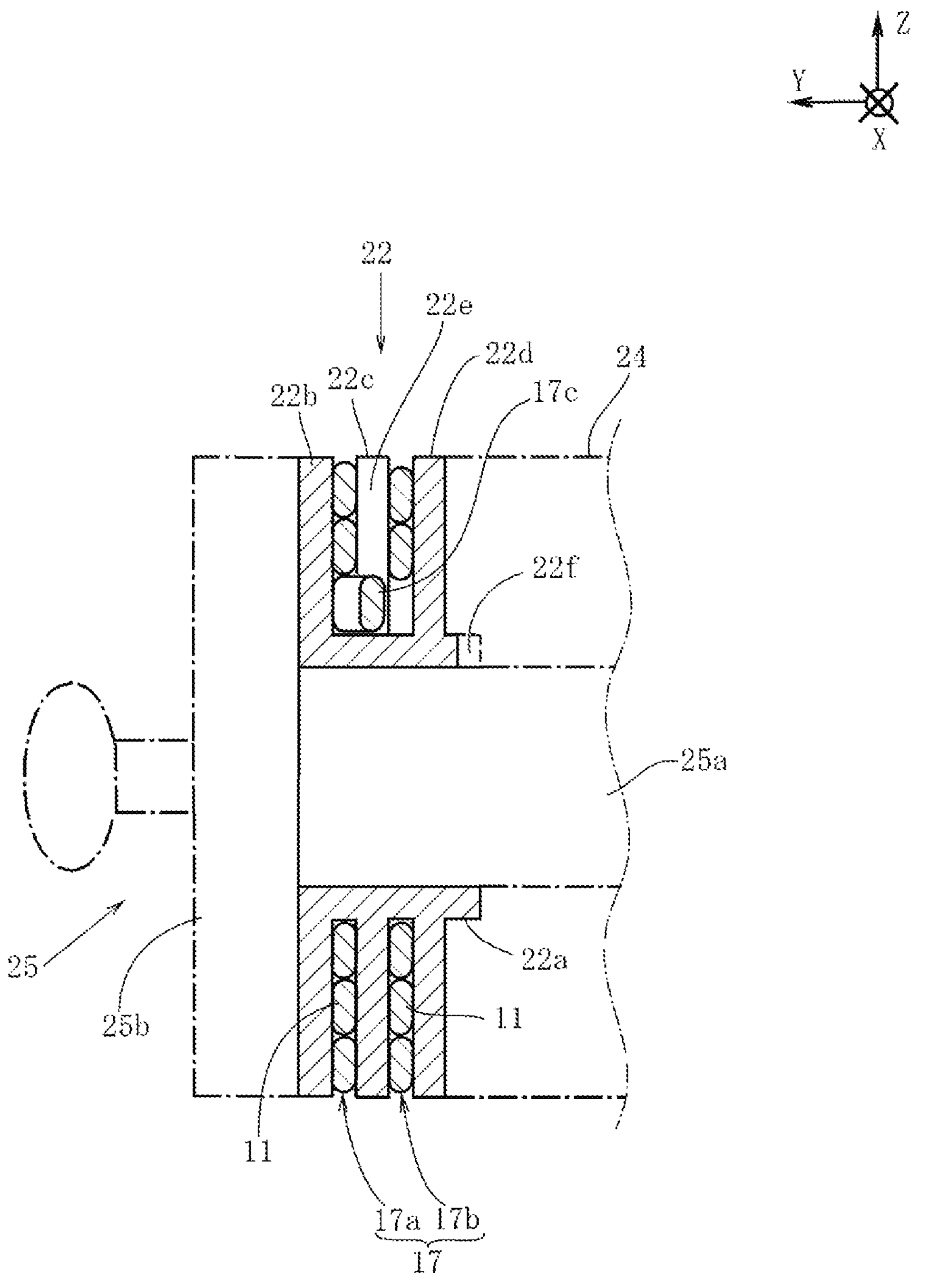
FIG. 10 is a cross-sectional view taken along the line E-E in FIG. 9, illustrating a cross-sectional surface of the alpha winding coil.

As illustrated in FIG. 1, the coil winding device 20 includes a wire-wound member 22 and a wire-wound-member rotation mechanism 21. The wire rod 11 delivered from the nozzle 51 is wound around the wire-wound member 22. The wire-wound-member rotation mechanism 21 is wire-wound member rotation means that rotates the wire-wound member 22 to wind the wire rod 11 delivered from the nozzle 51 around the wire-wound member 22. As illustrated in FIG. 4 and FIG. 10, the wire-wound member 22 includes a pipe-shaped winding body 22*a* and three circular-plate-shaped flanges 22*b*, 22*c*, and 22*d* formed at a peripheral area of the winding body 22*a*. The three circular-plate-shaped flanges 22*b*, 22*c*, and 22*d* are formed having clearances corresponding to the thickness t of the wire rod 11. At the intermediate flange 22*c*, a cutout 22*e* with which the wire rod 11 is communicated is formed.

Returning to FIG. 1, the wire-wound-member rotation mechanism 21 includes a servo motor 23, a motor moving mechanism 33, a first rotator 24, and a holder 25. The motor moving mechanism 33 moves the servo motor 23 in the three-axis directions. The first rotator 24 has a base end disposed coaxially with a rotation shaft 23*a* of the servo motor 23, and a distal end at which a lock mechanism 26 is disposed. The holder 25 is removably disposed at the distal end of the first rotator 24 to sandwich the wire-wound member 22 that winds the wire rod 11, with the first rotator 24.

Figure 3:
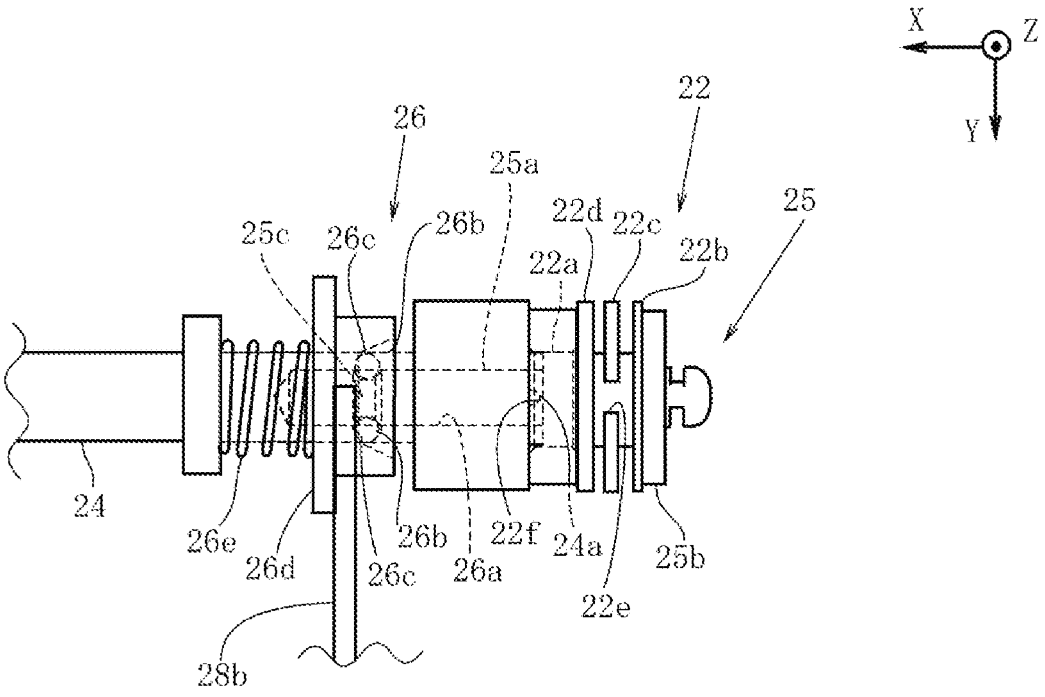
FIG. 3 is an enlarged view of a part B in FIG. 1, illustrating a mounting state of a wire-wound member at a wire-wound-member rotation mechanism.

As illustrated in FIG. 3 and FIG. 4, the holder 25 includes a coupling shaft 25*a* and a holding plate 25*b*. The coupling shaft 25*a* has a distal end locked to the lock mechanism 26. The holding plate 25*b* is mounted on a base end of the coupling shaft 25*a* to press one flange 22*b* of the wire-wound member 22 from outside in a state mounted on the distal end of the first rotator 24. The coupling shaft 25*a* is formed into a columnar shape having an outer diameter slightly smaller than an inner diameter of the winding body 22*a* that forms a tubular shape of the wire-wound member 22. This length is formed longer than a whole length of the winding body 22*a*. At a peripheral area of a distal end of the coupling shaft 25*a*, a ring groove 25*c* is formed. The holding plate 25*b* is formed having an outer diameter similar to an outer diameter of the one flange 22*b* of the wire-wound member 22.

The lock mechanism 26 disposed at the distal end of the first rotator 24 includes a coupling hole 26*a*, a horizontal hole 26*b*, a sphere body 26*c*, an operating member 26*d*, and a spring 26*e*. The coupling hole 26*a* is bored at the distal end of the first rotator 24 along an axial center. The coupling shaft 25*a* of the holder 25 is insertable into the coupling hole 26*a*. The horizontal hole 26*b* is formed at the distal end of the first rotator 24 as being intersect with the coupling hole 26*a*. The sphere body 26*c* is inserted into the horizontal hole 26*b* to be engaged with the ring groove 25*c* formed at the coupling shaft 25*a*. The operating member 26*d* is fitted into the first rotator 24 to move in the axial direction, thus inserting the sphere body 26*c* into the ring groove 25*c* or removing the sphere body 26*c* from the ring groove 25*c*. The spring 26*e* biases the operating member 26*d* in a direction that inserts the sphere body 26*c* into the ring groove 25*c*.

At the winding body 22*a*, a slit 22*f* extending in the axial direction from an end portion of the winding body 22*a* is formed. A protrusion 24*a* that can get into the slit 22*f* is formed at the first rotator 24. In view of this, when the distal end of the coupling shaft 25*a* inserted through the winding body 22*a* of the wire-wound member 22 is inserted into the coupling hole 26*a* to mount the holder 25 on the first rotator 24, the protrusion 24*a* gets into the slit 22*f* to inhibit rotation of the wire-wound member 22 with respect to the first rotator 24.

As illustrated in FIG. 1, the servo motor 23 is mounted on a mount 27, and the motor moving mechanism 33 moves the mount 27 in the three-axis directions. On the mount 27, an operating cylinder 28 that operates the lock mechanism 26 is mounted. The operating cylinder 28 has a rod 28*a* on which an engaging member 28*b* engaged with the operating member 26*d* of the lock mechanism 26 is mounted.

When the rod 28*a* of the operating cylinder 28 is sunk, as illustrated in FIG. 4, the operating member 26*d* retreats against biasing force of the spring 26*e*, thus ensuring insertion of the coupling shaft 25*a* into the coupling hole 26*a*. When the rod 28*a* of the operating cylinder 28 (FIG. 1) is projected in the state where the coupling shaft 25*a* has been inserted into the coupling hole 26*a*, as illustrated in FIG. 3, the operating member 26*d* again moves forward to press the sphere body 26*c* to the ring groove 25*c*. This restricts exit of the coupling shaft 25*a* from the coupling hole 26*a*.

On the other hand, in the state where the coupling shaft 25*a* has been inserted into the coupling hole 26*a*, when the rod 28*a* of the operating cylinder 28 is again sunk, the already inserted coupling shaft 25*a* can be extracted from the coupling hole 26*a*.

Thus, the lock mechanism 26 attachably/detachably mounts the holder 25 on the first rotator 24 mounted on the servo motor 23 that is a driving source. The holder 25 coupled to the first rotator 24 is configured to be both normally and reversely rotated around the Y-axis by the servo motor 23.

In the state where the holder 25 has been mounted on the first rotator 24, when the servo motor 23 drives to rotate the first rotator 24, the holder 25 and the wire-wound member 22 also rotate with the first rotator 24. When the servo motor 23 stops, the first rotator 24 stops, and the rotation of the holder 25 and the wire-wound member 22 also stops.

The wire-wound member 22 mounted on the distal end of the first rotator 24 by the holder 25 is configured to wind the wire rod 11 delivered from the wire rod delivering machine 50 by normally rotating.

Returning to FIG. 1, the mount 27 on which the servo motor 23 is mounted is mounted on the mounting 19 via the motor moving mechanism 33 movably in the three-axis directions. The motor moving mechanism 33 is constituted by combination of expansion/contraction actuators 34 to 36 in the X-axis, Y-axis, and Z-axis directions. The motor moving mechanism 33 constituted of the expansion/contraction actuators 34 to 36 in the X-axis, Y-axis, and Z-axis directions has a structure identical to that of the above-described nozzle moving mechanism 52. Thus, repeated description will be omitted.

The coil winding device 20 further includes a wire-storing-jig turning mechanism 40 as wire-storing-jig rotation means that turns the wire storing jig 30 to wind the wire rod 11 delivered from the wire storing jig 30 around the wire-wound member 22. This embodiment exemplifies a case where the wire storing jig 30 is disposed at the mounting 19 via a second rotator 41.

As illustrated in FIG. 1 and FIG. 5, on the mounting 19, a support wall 42 is disposed upright. The second rotator 41 extends in the Y-axis direction to be rotatably disposed at the support wall 42. On the support wall 42, a servo motor 43 that rotates the second rotator 41 is mounted. At the second rotator 41 and a rotation shaft 43*a* of the servo motor 43, pulleys 44*a*, 44*b* are disposed respectively. Between the pulleys 44*a*, 44*b*, a belt 44*c* is bridged.

It is configured such that when the servo motor 43 drives to rotate the rotation shaft 43*a*, the rotation is transmitted to the second rotator 41 via the belt 44*c* to rotate the second rotator 41 with the wire storing jig 30. At a distal end of the second rotator 41, a supporting member 46 perpendicular to the second rotator 41 is disposed. At the supporting member 46, a base end of a supporting parallel bar 47 parallel to a rotational central axis M of the second rotator 41 is disposed by being biased from the rotational central axis M.

Figure 7:
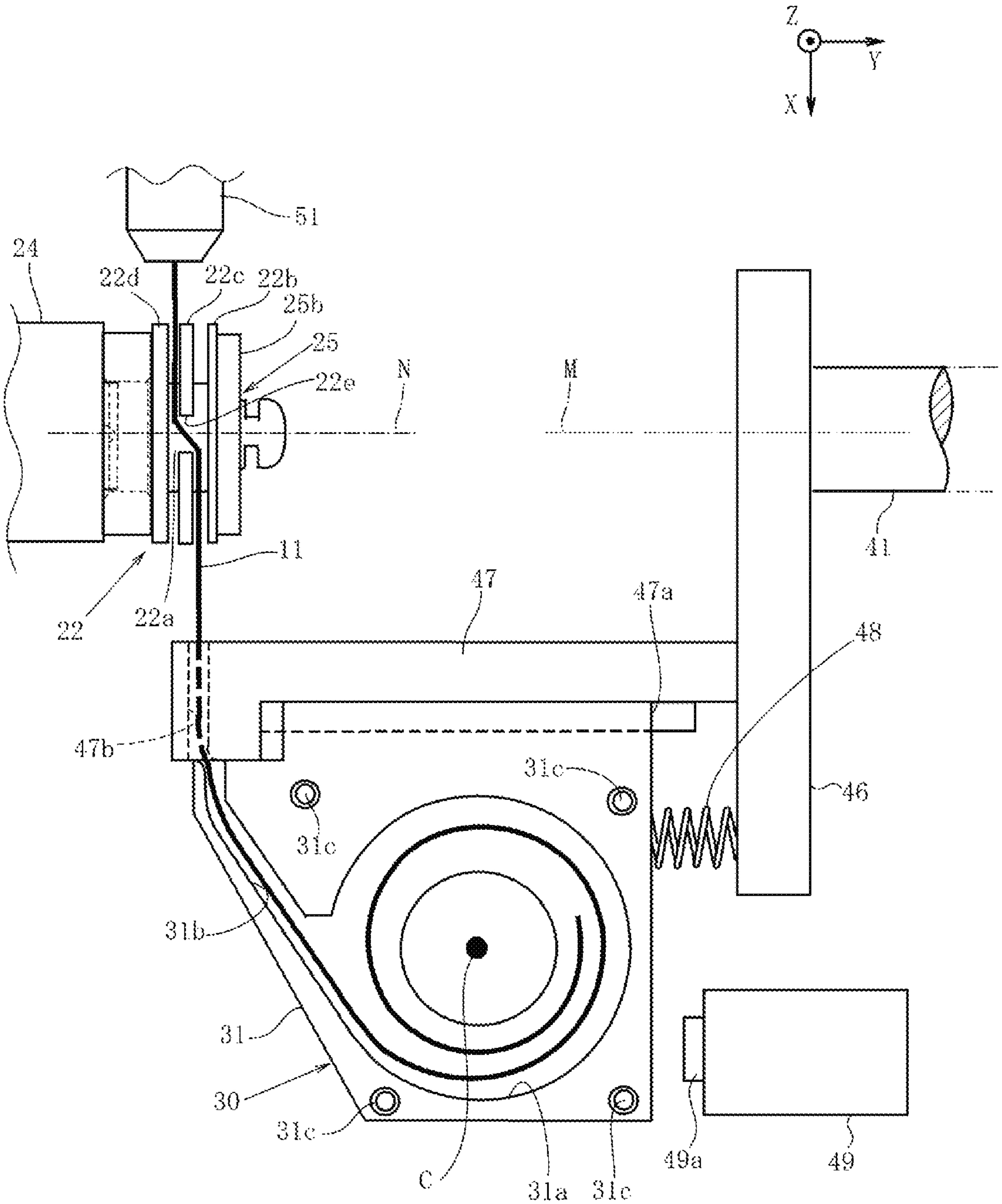
FIG. 7 is a top view illustrating a state where the wire rod between the wire storing jig and a nozzle has got into the wire-wound member.

As illustrated in FIG. 6 and FIG. 7, at the supporting parallel bar 47, a rail 47*a* parallel to the rotational central axis M of the second rotator 41 is disposed. On the rail 47*a*, the plate-shaped main body 31 of the wire storing jig 30 is movably mounted. That is, the wire storing jig 30 is mounted on the supporting parallel bar 47 by being biased from the rotational central axis M of the second rotator 41, and being movably in the Y-axis direction at an outside in a rotation radial direction of the supporting parallel bar 47.

The wire storing jig 30 is mounted such that its wire-storing central axis C is perpendicular to the rotational central axis M of the second rotator 41. That is, the wire storing jig 30 is mounted such that, at a virtual plane perpendicular to the rotational central axis M of the second rotator 41 and including the wire-storing central axis C of the wire storing jig 30, the wire-storing central axis C of the wire storing jig 30 will be a tangent line of a virtual circle whose center is the rotational central axis M of the second rotator 41. In other words, the wire storing jig 30 is mounted on the supporting parallel bar 47 such that the wire-storing central axis C of the wire storing jig 30 is perpendicular to a virtual plane including the rotational central axis M of the second rotator 41.

The wire storing jig 30 is mounted on the rail 47*a* movably parallel to the rotational central axis M, such that an open end of the communication groove 31*b* faces an insertion hole 47*b* and the rotational central axis M of the second rotator 41. At the supporting member 46, a coil spring 48 is disposed. The coil spring 48 pulls the wire storing jig 30 to the supporting member 46 side to bias the open end of the communication groove 31*b* as being shifted from the insertion hole 47*b*. On the other hand, at the mounting 19, a fluid pressure cylinder 49 is disposed. The fluid pressure cylinder 49 separates the wire storing jig 30 from the supporting member 46 against biasing force of the coil spring 48 to move the open end of the communication groove 31*b* as matching with the insertion hole 47*b*.

A method for manufacturing a coil using the coil winding device 20 will be described.

The method for manufacturing the coil according to the embodiment includes a wire storing process that stores the wire rod 11 and a coil formation process that forms a coil 17. In the wire storing process, the wire rod 11 delivered from the nozzle 51 is stored in the wire storing jig 30. In the coil formation process, the wire-wound member 22 is rotated to wind the wire rod 11 delivered from the nozzle 51 around the wire-wound member 22, and the wire storing jig 30 is turned around a rotation axis N of the wire-wound member 22 to wind the wire rod 11 delivered from the wire storing jig 30 around the wire-wound member 22, thus forming the coil 17. The following describes the respective processes in detail.

<Wire Storing Process>

The wire storing at the wire storing jig 30 is performed by delivering the rectangular wire rod 11 whose cross-sectional shape is rectangular through the nozzle 51, and then curving the rectangular wire rod 11 in the direction of the thickness t or winding the rectangular wire rod 11 over in the direction of the thickness t in the spiral.

As illustrated in FIG. 1 and FIG. 2, the wire rod 11 is prepared by being wound around the drum 62 as curving in the direction of the thickness t, and then, the drum 62 is disposed at the wire rod delivering machine 50. The wire rod 11 delivered from the drum 62 is introduced to the wire rod guide 63*a* disposed at the distal end of the tension bar 63 to be wired as being inserted through the nozzle 51 from the wire rod guide 63*a*.

As illustrated in FIG. 2, thus wired wire rod 11 between the wire rod guide 63*a* and the nozzle 51 is first held by the movable holding device 59 and the secured holding device 60 at the proximity of the nozzle 51. Thus, the movement of the wire rod 11 is inhibited. At this time, it is preferable that the expansion/contraction actuator 69 has separated the movable holding device 59 from the secured holding device 60 as indicated with a one dot chain line.

In this state, the nozzle moving mechanism 52 moves the nozzle 51 with the movable holding device 59 and the secured holding device 60, and then, as illustrated in FIG. 6, a distal end of the nozzle 51 is opposed to the opening end of the communication groove 31*b* of the wire storing jig 30.

A rod 49a of the fluid pressure cylinder 49 is projected to move the wire storing jig 30 as being separated from the supporting member 46 against the biasing force of the coil spring 48, thus matching the open end of the communication groove 31b with the insertion hole 47b.

Thereafter, in a state where the holding piece 60a of the secured holding device 60 illustrated in FIG. 2 is opened to allow the movement of the wire rod 11, the expansion/contraction actuator 69 moves the movable holding device 59 holding the wire rod 11 by the holding piece 59a toward the nozzle 51 by the predetermined length, as indicated with a solid arrow. Then, the wire rod 11 held by the movable holding device 59 is delivered from the nozzle 51 by the predetermined length.

As illustrated in FIG. 6, the wire rod 11 delivered from the nozzle 51 gets into the opening end of the communication groove 31b at the wire storing jig 30. The wire rod 11 reach the circumferential groove 31a from the communication groove 31b to be guided to the outer periphery of the circumferential groove 31a, thus being curved. Since the rectangular wire rod is used as the wire rod 11, the wire rod 11 is guided to the outer periphery of the circumferential groove 31a to be curved in the direction of the thickness t, and then, wound in the spiral in the circumferential groove 31a to be stored. The wire rod 11 is stored having a length required for forming one first coil 17a (FIG. 10) that constitutes an alpha winding coil 17 that will be obtained.

In the method for manufacturing the coil in this embodiment, since the wire rod 11 delivered from the nozzle 51 is stored to be curved or stored to be wound in the spiral, the stored wire rod 11 is not twisted.

When the length of the wire rod 11 does not reach the required length by simply moving the movable holding device 59 illustrated in FIG. 2 toward the nozzle 51 once, the movable holding device 59 is moved back and forth to sequentially deliver the wire rod 11 from the nozzle 51. Specifically, if the movable holding device 59 moves to reach the proximity of the nozzle 51, its movement is stopped. Then, the secured holding device 60 holds the wire rod 11 to once inhibit the movement of the wire rod 11. In that state, the holding piece 59a of the movable holding device 59 is opened to allow the movement of the wire rod 11. In that state, the expansion/contraction actuator 69 separates the movable holding device 59 from the nozzle 51 as indicated with the one dot chain line arrow.

Afterwards, again, the holding piece 59a of the movable holding device 59 is closed to hold the wire rod 11, and then, the holding piece 60a of the secured holding device 60 is again opened to allow the movement of the wire rod 11. In this state, the expansion/contraction actuator 69 moves the movable holding device 59 indicated with the one dot chain line that holds the wire rod 11 by the holding piece 59a toward the nozzle 51 by the predetermined length. This delivers the wire rod 11 held by the movable holding device 59 from the nozzle 51 again. By thus moving the movable holding device 59 back and forth, the wire rod 11 is sequentially delivered from the nozzle 51, thus storing the wire rod 11 with the required length in the wire storing jig 30.

<Coil Formation Process>

In the coil formation process, the rectangular wire rod 11 delivered from the nozzle 51 is wound around the wire-wound member 22 in a direction of the width W of the rectangular wire rod 11 to form the coil 17.

To mount the wire-wound member 22 on the wire-wound-member rotation mechanism 21, the rod 28a of the operating cylinder 28 (FIG. 1) is sunk, and then, the operating member 26d is shifted backward against the biasing force of the spring 26e as illustrated in FIG. 4. The coupling shaft 25a of the holder 25 is inserted into the winding body 22a of the wire-wound member 22, and then, the distal end of the coupling shaft 25a that projects from the winding body 22a is inserted into the coupling hole 26a.

Thus, the rod 28a of the operating cylinder 28 is projected in the state where the coupling shaft 25a has been inserted into the coupling hole 26a, and then, as illustrated in FIG. 3, the operating member 26d is again moved forward to press the sphere body 26c to the ring groove 25c. This prevents the coupling shaft 25a from exiting from the coupling hole 26a. Thus, the wire-wound member 22 is mounted on the distal end of the first rotator 24. At this time, the protrusion 24a of the first rotator 24 is got into the slit 22f of the winding body 22a to restrict the rotation of the wire-wound member 22 with respect to the first rotator 24.

Figure 8:
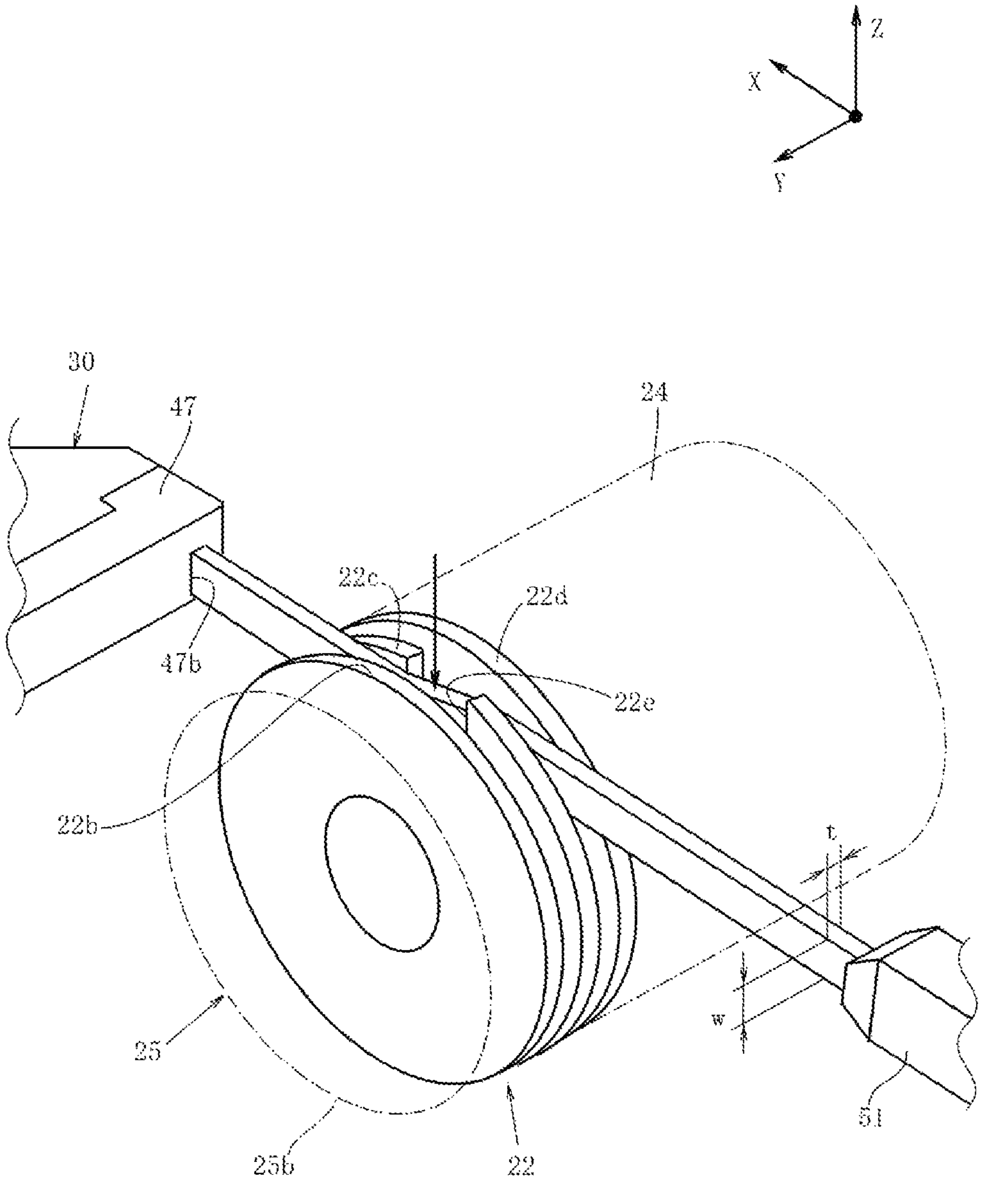
FIG. 8 is a perspective view illustrating the state where the wire rod between the wire storing jig and the nozzle has got into the wire-wound member.

Afterwards, in the state where the wire rod 11 has been projected from the nozzle 51, the nozzle moving mechanism 52 moves the nozzle 51 to separate the nozzle 51 from the wire storing jig 30. In that state, the motor moving mechanism 33 moves the wire-wound member 22 with the wire-wound-member rotation mechanism 21, and then, as illustrated in FIG. 8, the wire rod 11 between the wire storing jig 30 and the nozzle 51 is inserted into the cutout 22e formed at the intermediate flange 22c of the wire-wound member 22 to bring the wire rod 11 into contact with the winding body 22a. That is, the wire rod 11 extending from the wire storing jig 30 is got into a clearance between the distal-end-side flange 22b and the intermediate flange 22c of the wire-wound member 22, and then, the wire rod 11 extending from the nozzle 51 is got into a clearance between the base-end-side flange 22d and the intermediate flange 22c of the wire-wound member 22.

Thereafter, as illustrated in FIG. 7, the motor moving mechanism 33 moves the wire-wound member 22 to match the rotation axis N of the wire-wound member 22 with the rotational central axis M of the second rotator 41. In that state, the rod 49a of the fluid pressure cylinder 49 is sunk, and then, the coil spring 48 pulls the wire storing jig 30 to the supporting member 46 side to bias the open end of the communication groove 31b as being shifted from the insertion hole 47b, thus sandwiching the wire rod 11 that passes through both of the communication groove 31b and the insertion hole 47b to add a constant tension to the wire rod 11.

Figure 9:
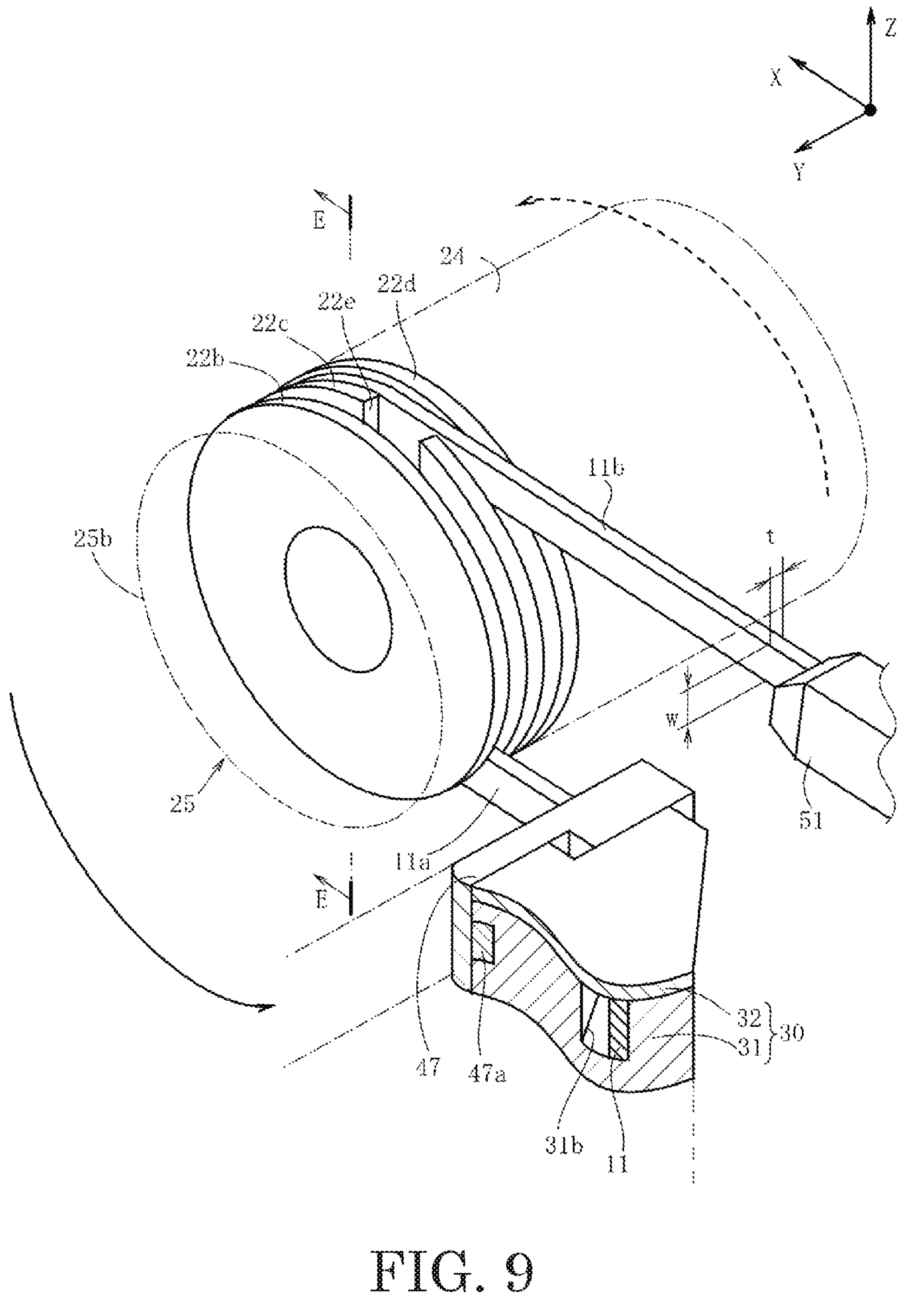
FIG. 9 is a view illustrating a state where the wire rod has wound around the wire-wound member to obtain an alpha winding coil.

Then, as illustrated in FIG. 9, the wire-wound-member rotation mechanism 21 rotates the wire-wound member 22 as indicated with a dashed arrow, and the wire-storing-jig turning mechanism 40 turns the wire storing jig 30 around the wire-wound member 22 as indicated with a solid arrow at a twice speed of a rotation speed of the wire-wound member 22.

That is, the wire storing jig 30 is rotated around the wire-wound member 22 at the twice speed of the rotation speed of the wire-wound member 22 to deliver the wire rod 11 stored in the wire storing jig 30 from the wire storing jig 30, thus winding the wire rod 11 around the clearance between the distal-end-side flange 22b and the intermediate flange 22c at the winding body 22a. This forms the first coil 17a constituted of the wire rod 11 wound around the clearance between the distal-end-side flange 22b and the intermediate flange 22c at the winding body 22a (FIG. 10).

Here, the rotational central axis M of the wire-storing-jig turning mechanism 40 and the wire-storing central axis C of the wire storing jig 30 are mutually orthogonal, and the rectangular wire rod 11 curves in the direction of the thickness t to be stored or wound over in the direction of the thickness t to be stored. In view of this, even if the wire-storing-jig turning mechanism 40 turns the wire storing jig 30 to wind the wire rod 11 delivered from the wire storing jig 30 around the wire-wound member 22, the wire rod 11 delivered from the wire storing jig 30 is not twisted. The wire-storing-jig turning mechanism 40 turns the wire storing jig 30 to wind the wire rod 11 delivered from the wire storing jig 30 around the wire-wound member 22. This, as illustrated in FIG. 10, ensures winding of the wire rod 11 around the winding body 22*a* of the wire-wound member 22 by being curved in a width direction.

Since, in the wire storing jig 30, the wire rod 11 having the length required for forming the first coil 17*a* is store, the first coil 17*a* is formed of all the wire rod 11 extracted from the wire storing jig 30. In view of this, if the first coil 17*a* is formed, an end portion of the wire rod 11 gets out from the wire storing jig 30 to constitute a wire rod 11*a* at a start of winding (see FIG. 9).

At this time, the tension added to the wire rod 11 is added from force that sandwiches the wire rod 11 that passes through both of the communication groove 31*b* and the insertion hole 47*b* by the coil spring 48. Accordingly, in the formation of the first coil 17*a*, the tensile force of the wire rod 11 is maintained at the predetermined value, thus preventing generation of a difference at a degree of contact between layers of the wire rod 11 at the first coil 17*a*.

In accordance with the formation of the first coil 17*a*, the wire-wound member 22 is rotated to wind the wire rod 11 newly delivered from the nozzle 51 around the clearance between the base-end-side flange 22*d* and the intermediate flange 22*c* at the winding body 22*a*. This forms the other second coil 17*b* constituted of the wire rod 11 newly extracted from the nozzle 51 to be wound around the clearance between the intermediate flange 22*c* and the base-end-side flange 22*d* at the winding body 22*a* (FIG. 10).

In the formation of the second coil 17*b*, the tension device 53 adds the constant tension to the wire rod 11 delivered from the wire rod delivering machine 50. As illustrated in FIG. 1, at the tension device 53, the spring 66 adds the tensile force to the wire rod 11 via the tension bar 63. Accordingly, in the formation of the second coil 17*b*, the tensile force of the wire rod 11 is maintained at the predetermined value. This prevents generation of a difference at a degree of contact between layers of the wire rod 11 at the second coil 17*b*.

When the second coil 17*b* is formed, the wire rod 11 delivered from the wire rod delivering machine 50 is wound around the wire-wound member 22 rotated by the wire-wound-member rotation mechanism 21. Thus, the wire rod 11 delivered from the wire rod delivering machine 50 is not twisted. Then, the winding around the wire-wound member 22 by the wire-wound-member rotation mechanism 21 is ensured, as shown in FIG. 9, by winding around the winding body 22*a* of the wire-wound member 22 while curving in the direction of the width W of the wire rod 11.

Thus, the wire-wound member 22 is rotated, and the wire storing jig 30 is turned around the wire-wound member 22 at the twice speed, thus forming the coil 17 illustrated in FIG. 10 such that the first coil 17*a* and the second coil 17*b* constituted of the wire rod 11 wound in the spiral are coupled by an inside crossover wire 17*c*.

As the first coil 17*a* and the second coil 17*b* illustrated in FIG. 10, one that the rectangular wire rod 11 is curved in the width direction and wound over to be wound around the winding body 22*a* in three turns is each exemplified. Then, the coil 17 formed at the wire-wound member 22 will be the alpha winding coil 17 where both of the wire rod 11*a* at the start of winding extracted from the wire storing jig 30 and a wire rod 11*b* (FIG. 9) at an end of winding delivered from the nozzle 51 to be wound around the wire-wound member 22 are positioned at an outermost periphery.

After the second coil 17*b* has been obtained, as illustrated in FIG. 2, the holding piece 60*a* of the secured holding device 60 holds the wire rod 11 to prevent the wire rod 11 from being delivered from the wire rod delivering machine 50. Then, a cutter device (not illustrated) cuts the wire rod 11 extending from the second coil 17*b* to the nozzle 51. This can separate the alpha winding coil 17 formed at the wire-wound member 22.

Here, as illustrated in FIG. 10, since the holding plate 25*b* of the holder 25 sandwiches the wire-wound member 22 with the first rotator 24, even if the wire-wound member 22 is made of resin having flexibility, and even if the wire rod 11 that curves in the width direction to be wound around the winding body 22*a* attempts to shift in an axial direction of the wire-wound member 22, the flanges 22*b*, 22*c*, and 22*d* of the wire-wound member 22 do not deform by force that the wire rod 11 attempts to shift.

Forming the coil 17 by winding the rectangular wire rod 11 over in the width direction to be wound can obtain the coil 17 whose winding starting end 11*a* and winding terminating end 11*b* are wired at the identical winding layer, and its winding width is small and relatively thin. This can also improve a rate occupied by the wire rod 11 in the obtained coil 17.

The above-described embodiment has described the nozzle moving mechanism 52 and the motor moving mechanism 33 constituted by the combination of the expansion/contraction actuators in the X-axis, Y-axis, and Z-axis directions. However, these moving mechanisms are not limited to this structure, and may be another format insofar as the nozzle 51 and the mount 27 are movable in the three-axis directions with respect to the mounting 19.

The above-described embodiment has described the case where the wire-wound member 22 is rotated and the wire storing jig 30 is turned around the wire-wound member 22 at the twice speed. However, the second coil may be formed such that the wire-wound member 22 and the wire storing jig 30 are rotated at an identical speed to wind the wire rod 11 delivered from the nozzle 51 in the spiral. And before that or thereafter, the first coil may be formed such that only the wire storing jig 30 is turned around the wire-wound member 22 whose rotation has been stopped to wind and the wire rod 11 delivered from the wire storing jig 30 in the spiral. Even this case can obtain the coil 17 illustrated in FIG. 10 such that the first coil 17*a* and the second coil 17*b* constituted of the wire rod 11 wound in the spiral are coupled by the inside crossover wire 17*c*.

The above-described embodiment has described the configuration that the three circular-plate-shaped flanges 22*b*, 22*c*, and 22*d* are formed at the peripheral area of the winding body 22*a* of the wire-wound member 22. However, insofar as the alpha winding coil 17 can be obtained, the wire-wound member 22 may omit the intermediate flange 22*c*. Although not illustrated, the wire-wound member may be rod shape. After the alpha winding coil 17 has been obtained, this rod-shaped wire-wound member may be extracted from the coil 17 to obtain what is called an air core alpha winding coil 17.

The above-described embodiment has described the case where the tension device 53 at the wire rod delivering machine 50 adds the constant tension to the wire rod 11 delivered from the nozzle 51 by the spring 66, shifts the open end of the communication groove 31*b* from the insertion hole 47*b* to sandwich the wire rod 11 by the coil spring 48, and then, adds the constant tension to the wire rod 11 delivered from the wire storing jig 30. However, insofar as the predetermined tension can be added to the wire rod 11, the tension device 53 is not limited to these structures.

For example, although not illustrated, the tension device 53 may be one that includes a fluid pressure cylinder and a coil spring that directly move the drum 62 to add the constant tension to the wire rod 11.

Further, the above-described embodiment has described the case where the wire rod 11 is the rectangular wire rod whose cross-sectional shape is rectangular. However, the wire rod 11 may have a cross-sectional shape that is square shape, what is called a square wire, or a cross-sectional shape that is circular shape, what is called a round wire.

According the above-mentioned embodiment, the following effect is provided.

In the coil winding device 20 and the method for manufacturing the coil according to the embodiment, since the wire rod 11 delivered from the nozzle 51 is stored to be curved in the direction of the thickness t or stored to be wound over in the direction of the thickness t, the wire rod 11 is not twisted in storing. In the wire winding, since the wire rod 11 delivered from the wire rod delivering machine 50 is wound around the wire-wound member 22 rotated by the wire-wound-member rotation mechanism 21, the wire rod 11 delivered from the wire rod delivering machine 50 is not twisted. Since the wire-storing-jig turning mechanism 40 rotates the wire storing jig 30 to wind the wire rod 11 delivered from the wire storing jig 30 around the wire-wound member 22, the wire rod 11 delivered from the wire storing jig 30 is also not twisted. Thus, the wire rod 11 is wound around the wire-wound member 22 without being twisted.

Since the rotation axis N of the wire-wound member 22 and the wire-storing central axis C of the wire storing jig 30 are mutually orthogonal, the rectangular wire rod 11 whose cross-sectional shape is rectangular is allowed to be wound over in the width direction W. Thus forming the coil 17 can obtain the coil 17 whose winding starting end and winding terminating end are wired at the identical winding layer, and its winding width is small and relatively thin. Accordingly, this can improve the rate occupied by the wire rod 11 in the coil 17.

Embodiments of this invention were described above, but the above embodiments are merely examples of applications of this invention, and the technical scope of this invention is not limited to the specific constitutions of the above embodiments.

This application claims priority based on Japanese Patent Application No. 2015-055755 filed with the Japan Patent Office on Mar. 19, 2015, the entire contents of which are incorporated into this specification.

The invention claimed is:

1. A coil winding device comprising:

a wire rod delivering machine configured to deliver a wire rod through a nozzle;

a wire storing jig configured to store the wire rod delivered from the nozzle;

a wire-wound member around which the wire rod is wound;

a wire-wound-member rotation mechanism configured to rotate the wire-wound member to wind the wire rod delivered from the nozzle around the wire-wound member; and a wire-storing-jig turning mechanism configured to turn the wire storing jig around a rotation axis of the wire-wound member to wind the wire rod delivered from the wire storing jig around the wire-wound member, wherein:

the wire rod is a rectangular wire rod whose cross-sectional shape is rectangular, and the rotation axis of the wire-wound member and a wire-storing central axis of the wire storing jig are mutually orthogonal.

2. The coil winding device according to claim 1, wherein:

the wire storing of the wire storing jig is performed such that the rectangular wire rod is wound to be curved in a thickness direction, and the winding of the wire rod around the wire-wound member is a winding over of the rectangular wire in a width direction.

3. A method for manufacturing a coil, comprising:

storing a wire rod delivered from a nozzle in a wire storing jig;

rotating a wire-wound member to wind the wire rod delivered from the nozzle around the wire-wound member; and turning the wire storing jig around a rotation axis of the wire-wound member to wind the wire rod delivered from the wire storing jig around the wire-wound member, wherein:

the wire rod is a rectangular wire rod whose cross-sectional shape is rectangular, and the rotation axis of the wire-wound member and a wire-storing central axis of the wire storing jig are mutually orthogonal.

4. The method for manufacturing the coil according to claim 3, wherein:

the wire storing of the wire storing jig is performed such that the rectangular wire rod is wound to be curved in a thickness direction, and the winding of the wire rod around the wire-wound member is performed such that the rectangular wire rod is wound over in a width direction.

* * * * *